(12) United States Patent
Krishnamoorthy et al.

(10) Patent No.: US 8,768,170 B2
(45) Date of Patent: *Jul. 1, 2014

(54) OPTICAL DEVICE WITH REDUCED THERMAL TUNING ENERGY

(75) Inventors: Ashok V. Krishnamoorthy, San Diego, CA (US); Xuezhe Zheng, San Diego, CA (US); Guoliang Li, San Diego, CA (US); John E. Cunningham, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/156,144

(22) Filed: Jun. 8, 2011

(65) Prior Publication Data
US 2012/0207479 A1 Aug. 16, 2012

Related U.S. Application Data

(63) Continuation-in-part of application No. 12/493,509, filed on Jun. 29, 2009, now Pat. No. 8,204,385.

(60) Provisional application No. 61/427,711, filed on Dec. 28, 2010.

(51) Int. Cl.
 *H04J 14/02* (2006.01)
(52) U.S. Cl.
 USPC ............................................. 398/79; 398/91
(58) Field of Classification Search
 CPC ..................................................... H04J 14/012
 USPC ............................................. 398/79, 91, 85
 See application file for complete search history.

(56) References Cited

U.S. PATENT DOCUMENTS

| 7,848,599 | B2 * | 12/2010 | Cunningham et al. | 385/1 |
| 7,977,622 | B2 * | 7/2011 | McLaren et al. | 250/227.11 |
| 8,131,119 | B2 * | 3/2012 | Cunningham et al. | 385/1 |
| 8,139,939 | B2 * | 3/2012 | Rasztovits-Wiech | 398/67 |
| 8,155,531 | B2 * | 4/2012 | Murthy et al. | 398/159 |
| 8,204,385 | B2 * | 6/2012 | Zheng et al. | 398/182 |
| 8,325,773 | B2 * | 12/2012 | Krishnamoorthy et al. | 372/36 |

(Continued)

OTHER PUBLICATIONS

Krishnamoorthy, Ashok V. et al., "Computer Systems Based on Silicon Photonic Interconnects", vol. 97, No. 7, Jul. 2009, Proceedings on the IEEE, pp. 1337-1361.

(Continued)

*Primary Examiner* — Ken Vanderpuye
*Assistant Examiner* — Amritbir Sandhu
(74) *Attorney, Agent, or Firm* — Park, Vaughan, Fleming & Dowler LLP; Steven E. Stupp

(57) ABSTRACT

An optical device that includes multiple optical modulators having target operating wavelengths that are distributed over a band of wavelengths and actual operating wavelengths is described. For example, the target operating wavelengths of adjacent optical modulators may be separated by a wavelength increment. Moreover, because of differences between the actual operating wavelengths and the target operating wavelengths of the optical modulators, tuning elements may be used to tune the optical modulators so that the actual operating wavelengths match corresponding carrier wavelengths in a set of optical signals. Furthermore, control logic in the optical device may assign the optical modulators to the corresponding carrier wavelengths based at least on differences between the carrier wavelengths and the actual operating wavelengths, thereby reducing an average tuning energy associated with the tuning elements.

20 Claims, 8 Drawing Sheets

(56) References Cited

U.S. PATENT DOCUMENTS

| | | | |
|---|---|---|---|
| 8,340,479 B2* | 12/2012 | Zheng et al. | 385/14 |
| 2005/0053377 A1* | 3/2005 | Yoo | 398/79 |
| 2006/0088319 A1* | 4/2006 | Morton | 398/79 |
| 2007/0116468 A1* | 5/2007 | Ji et al. | 398/79 |
| 2010/0183312 A1* | 7/2010 | Bolla et al. | 398/85 |
| 2010/0247021 A1* | 9/2010 | Cunningham et al. | 385/1 |
| 2010/0290736 A1* | 11/2010 | Cunningham et al. | 385/14 |
| 2010/0290790 A1* | 11/2010 | Murthy et al. | 398/192 |
| 2010/0329685 A1* | 12/2010 | Zheng et al. | 398/83 |
| 2011/0033188 A1* | 2/2011 | Elbers et al. | 398/79 |
| 2011/0280579 A1* | 11/2011 | McLaren et al. | 398/79 |
| 2011/0293279 A1* | 12/2011 | Lam et al. | 398/79 |
| 2012/0057866 A1* | 3/2012 | McLaren et al. | 398/25 |
| 2012/0087674 A1* | 4/2012 | Roberts et al. | 398/141 |
| 2012/0093184 A1* | 4/2012 | Krishnamoorthy et al. | 372/36 |
| 2013/0011139 A1* | 1/2013 | Hardy et al. | 398/79 |
| 2013/0315599 A1* | 11/2013 | Lam et al. | 398/79 |

OTHER PUBLICATIONS

Krishnamoorthy, Ashok V. et al., "Exploiting CMOS manufacturing to reduce tuning requirements for resonant optical devices", 2011, IEEE Photonics Journal, Special Issue on Photonics Materials & Integration.

* cited by examiner

OPTICAL DEVICE WITH REDUCED THERMAL TUNING ENERGY

CROSS REFERENCE TO RELATED APPLICATION

This application is a continuation-in-part, and hereby claims priority under 35 U.S.C. §120 to U.S. Non-provisional patent application Ser. No. 12/493,509, entitled "Optical Device with Reduced Thermal Tuning Energy," by Xuezhe Zheng, Ashok V. Krishnamoorthy, John E. Cunningham and GuoLiang Li, filed on Jun. 29, 2009, and under 35 U.S.C. §119(e) to U.S. Provisional Patent Application Ser. No. 61/427,711, entitled "Optical Device with Reduced Thermal Tuning Energy: Methods of Spreading Ring Resonances of Cascaded Rings Across Their Free-Spectral Range," by Ashok V. Krishnamoorthy, Xuezhe Zheng, GuoLiang Li, and John E. Cunningham, filed on Dec. 28, 2010, the contents of both of which are herein incorporated by reference.

GOVERNMENT LICENSE RIGHTS

This invention was made with United States Government support under Agreement No. HR0011-08-9-0001 awarded by the Defense Advanced Research Projects Administration. The United States Government has certain rights in the invention.

BACKGROUND

1. Field

The present disclosure relates to an optical device for communicating optical signals. More specifically, the present disclosure relates to an optical device that operates with reduced tuning energy.

2. Related Art

Wavelength division multiplexing (WDM) is widely used to communicate modulated data at different carrier wavelengths on a common optical waveguide. By using different carrier wavelengths, WDM can effectively overcome optical-fiber congestion, which is a potential problem in optical modules that include parallel optical transceivers with one channel per optical fiber. Moreover, by significantly reducing the number of optical fibers per optical module, WDM can simplify optical modules, thereby reducing their cost and size.

Dense WDM (DWDM) is a variation on WDM that uses a narrow spacing between adjacent wavelengths. This is typically achieved by modulating data directly onto a highly stable optical carrier, and then combining multiple carriers in an optical fiber. DWDM allows a large number of channels to be accommodated within a given wavelength band, and thus offers higher performance.

In DWDM systems, a variety of optical devices are used, such as: optical waveguides, optical modulators, optical multiplexers (such as add filters), optical de-multiplexers (such as drop filters), optical proximity couplers, optical filters, optical switches and optical detectors. While some of these optical devices (such as optical waveguides, optical proximity couplers and optical detectors) are broadband components that are relatively insensitive to ambient temperature changes and fabrication variation, wavelength-selective optical devices (such as resonator-based optical modulators, optical multiplexers, optical filters and optical de-multiplexers) can be very sensitive to these changes and variations. In order to compensate for the corresponding changes in the actual operating wavelengths of these wavelength-selective optical devices (relative to predetermined desired or target operating wavelengths), a given wavelength-selective optical device is typically phase-tuned to a particular carrier wavelength of a given channel.

Thermal tuning is a popular tuning technique to perform this phase tuning because it provides the ability to produce large phase shifts. Existing thermal tuning techniques include direct heating (which is implemented by doping in an optical waveguide) and indirect heating (in which a heater is heated in proximity to the optical waveguide). Typically, the direct-heating technique is more energy-efficient than indirect heating, but it can prevent the optical waveguide from performing additional functions (because of the constraint on the doping density), and it can introduce additional optical losses due to free-carrier absorption (which can degrade the quality factor of an optical resonator).

In principle, optical devices can be made on silicon substrates, because silicon provides many benefits for optical communication. For example, the high index-of-refraction contrast between silicon and silicon dioxide can be used to create sub-micron optical waveguides to confine light with spatial densities that are up to 100× larger than in a single-mode optical fiber. Furthermore, by using silicon-on-insulator (SOI) technology, a silicon optical waveguide can be surrounded by silicon dioxide on all four sides, which facilitates low-loss, on-chip optical waveguides and active devices (such as optical detectors and optical modulators). Silicon-based optical devices can additionally be used to implement a wide variety of optical components for use in WDM communication. These silicon-based optical devices offer numerous advantages, including: miniaturization, low-energy modulation, the ability to integrate with other devices in silicon, and/or the ability to leverage the large, existing silicon manufacturing infrastructure.

Unfortunately, there are problems associated with silicon-based optical devices. A notable problem arises from the high thermal conductivity of silicon. While this helps remove the heat dissipated by electrical circuits, it can make it more difficult to thermally tune a silicon-based optical device. In particular, because the actual operating wavelength of a silicon-based optical device (such as the resonant wavelength of an optical resonator) strongly depends on temperature, the actual operating wavelength is typically tuned using either direct or indirect heating to change the operating temperature of the silicon-based optical device. However, the high thermal conductivity of silicon results in excessive thermal coupling to the surrounding environment. Consequently, thermal tuning of silicon-based optical devices often consumes a disproportionately large amount of energy (typically, 50-100 mW for a phase shift of 180°). This high power consumption can offset the advantages provided by silicon, and makes it more difficult to use silicon-based optical devices to implement optical communication (such as WDM) in computing systems (especially in systems that have multiple instances of the optical devices).

Hence, what is needed is an optical device that can be thermally tuned without the above-described problems.

SUMMARY

One embodiment of the present disclosure provides an optical device deposited on a substrate. This optical device includes an optical waveguide that receives a set of optical signals, where a given optical signal has a carrier wavelength, and carrier wavelengths of the set of optical signals span a band of wavelengths. A transmitter in the optical device includes a transmitter group of tuning elements, and a group of transmitter optical modulators that are optically coupled to the optical waveguide and coupled to the corresponding transmitter group of tuning elements that tune the group of transmitter optical modulators. Note that the group of transmitter optical modulators have: target operating wavelengths, actual operating wavelengths, and free spectral ranges. Furthermore, transmitter optical modulators in the group of transmitter optical modulators have different target operating wavelengths that are distributed over the band of wavelengths, and the free spectral ranges around the target operating wavelengths encompass the band of wavelengths. Additionally, control logic in the optical device assigns transmitter optical modulators in the group of transmitter optical modulators to corresponding carrier wavelengths based on differences between the carrier wavelengths and the actual operating wavelengths, thereby reducing an average thermal energy associated with the transmitter group of tuning elements.

Note that the target operating wavelengths of adjacent transmitter optical modulators may be separated by a wavelength increment.

Moreover, the transmitter optical modulators may include ring resonators having different resonant wavelengths, which correspond to the target operating wavelengths of the ring resonators. These different resonant wavelengths may be associated with different optical-path lengths in the ring resonators. For example, the ring resonators may have different radii, such as embodiments where the radii are incrementally increased between adjacent ring resonators in the transmitter optical modulators. Alternatively or additionally, the ring resonators may have: different effective indices of refraction, different stresses, and/or different widths.

In some embodiments, the ring resonators include rib optical waveguides, where etch depths of the rib optical waveguides in the ring resonators are different.

Furthermore, the ring resonators may be defined on a semiconductor substrate, where the semiconductor substrate has a reduced thickness proximate to the ring resonators, thereby providing a linear bias of semiconductor thickness.

Additionally, the control logic may assign the transmitter optical modulators to the corresponding carrier wavelengths to minimize the average tuning energy.

Note that in some embodiments thermal tuning may be used. Consequently, the transmitter group of tuning elements may include heaters that selectively heat the corresponding optical modulators to correct differences between the target operating wavelengths at a given temperature and the actual operating wavelengths at the given temperature.

In some embodiments, the optical device includes a receiver. This receiver may include a receiver group of tuning elements, and a group of wavelength drop filters that are optically coupled to the optical waveguide and coupled to the corresponding receiver group of tuning elements that tune the group of wavelength drop filters. Note that the group of wavelength drop filters may have: target operating wavelengths, actual operating wavelengths, and free spectral ranges. Furthermore, wavelength drop filters in the group of wavelength drop filters may have different target operating wavelengths that are distributed over the band of wavelengths, and the free spectral ranges around the target operating wavelengths of the group of wavelength drop filters may encompass the band of wavelengths. Additionally, the receiver may include detectors that are optically coupled to the corresponding wavelength drop filters in the group of wavelength drop filters. In these embodiments, the control logic assigns wavelength drop filters in the group of wavelength drop filters to corresponding carrier wavelengths based at least on differences between the carrier wavelengths and the actual operating wavelengths of the wavelength drop filters in the group of wavelength drop filters, thereby reducing an average tuning energy associated with the receiver group of tuning elements.

Another embodiment provides a computer system that includes an integrated circuit that includes the optical device.

Another embodiment provides a method for configuring the optical device, which may be performed by the control logic. During this method, the control logic determines the differences between the carrier wavelengths in the set of optical signals and the actual operating wavelengths of the group of optical modulators. Note that the optical modulators may have target operating wavelengths that are distributed over the band of wavelengths associated with the set of optical signals. Then, the control logic assigns optical modulators in the group of optical modulators to corresponding carrier wavelengths based at least on the determined differences, thereby reducing the average tuning energy associated with a group of tuning elements.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a computer system that includes the optical device, and a method for configuring the optical device are described. This optical device includes multiple optical modulators having target operating wavelengths that are distributed over a band of wavelengths and actual operating wavelengths. For example, the target operating wavelengths of adjacent optical modulators may be separated by a wavelength increment. Moreover, because of differences between the actual operating wavelengths and the target operating wavelengths of the optical modulators, tuning elements may be used to tune the optical modulators so that the actual operating wavelengths match corresponding carrier wavelengths in a set of optical signals. Furthermore, control logic in the optical device may assign the optical modulators to the corresponding carrier wavelengths based at least on differences between the carrier wavelengths and the actual operating wavelengths. Using this configuration technique, the average tuning range of the optical modulators can be reduced to a fraction of a 180° phase shift. Consequently, if thermal tuning is used, this configuration technique allows the average thermal tuning energy associated with the heating elements to be reduced by up to 5-10 times the average thermal tuning energy associated with existing thermal tuning techniques.

A wide variety of tuning techniques may be used to tune the optical modulators. For example, if the optical modulators include ring resonators, the tuning technique may include: forward injection of carriers into the ring resonators and voltage-based tuning of an electro-optical material(s) disposed on the ring resonators. Alternatively or additionally, thermal tuning may be used to adjust the temperature of the optical modulators and, thus, to reduce differences between the target operating temperatures and the actual operating temperatures. In the discussion that follows, thermal tuning is used as an illustrative example of the tuning technique.

Figure 1A:
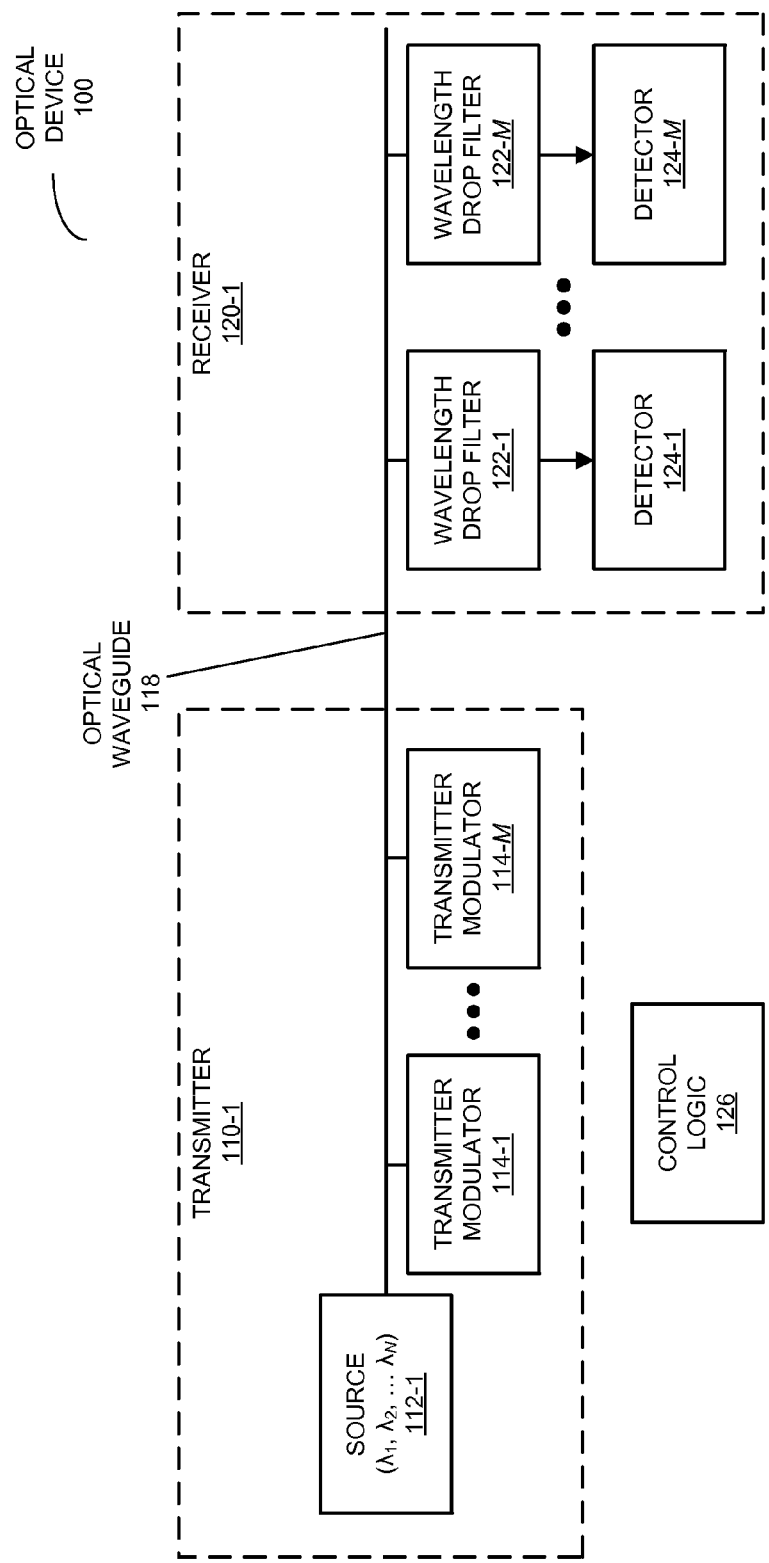
FIG. 1A is a block diagram illustrating an optical device in accordance with an embodiment of the present disclosure.

We now describe embodiments of an optical device. A silicon-photonic WDM link for inter- or intra-chip communication typically includes a link with several channels, which each have one or more associated carrier wavelengths ($\lambda_i$). This is shown in FIG. 1A, which presents a block diagram illustrating an optical device 100 that may be implemented on one or more substrates. In this optical device, source 112-1 (such as a laser or an optical waveguide) in transmitter 110-1 provides a set of optical signals having carrier wavelengths $\lambda_i$, which are typically predefined and fixed, and which collectively span a band of wavelengths (or a bandwidth). For example, the carrier wavelengths may correspond to 4, 8, 16, 32 or 64 channels in a WDM link. Information (such as data) is communicated to receiver 120-1 by modulating and wavelength multiplexing these optical signals using parallel spatially cascaded transmitter optical modulators 114 onto optical waveguide 118. At receiver 120-1, the modulated optical signals are separated using wavelength drop filters 122, and the information is recovered using corresponding optical detectors 124.

While a wide variety of optical components can be used to implement transmitter optical modulators 114 and wavelength drop filters 122, in the discussion that follows ring resonators are used as an illustrative example. As a high-Q device, a ring modulator has a narrow bandwidth for any particular resonance order, making it a very good wavelength selective device. But a ring resonator also exhibits many resonance orders. These resonance orders offer similar (degenerate) optical performance within a fairly wide wavelength range, which makes the ring modulator a quasi-broadband device. Although it can be difficult to fabricate a ring modulator such that its operating wavelength is aligned with a predefined wavelength, the resonance closest to the predefined-wavelength channel can be selected to minimize any tuning required. In addition, because ring resonators are wavelength selective, multiplexing may not be needed after the modulation stage if the multiple un-modulated wavelengths are input to transmitter 110-1 on a common waveguide. This architecture allows a set of cascaded rings to simultaneously provide both signal modulation and wavelength multiplexing functionality, which simplifies the architecture of optical device 100 relative to optical device 150 (described below with reference to FIG. 1B). In order to implement this architecture with a channel spacing of $\delta\lambda$, each ring device may need to have a free spectral range (FSR) that is greater than or equal to $n\delta\lambda$, where n is the number of wavelength channels.

Because silicon-based ring resonator modulators are high-Q devices, they are usually wavelength selective and sensitive to ambient temperature change. Furthermore, because of fabrication tolerances, it can be difficult to achieve ring resonance at predefined wavelength grids. Typically, tuning is used in applications of ring modulators in WDM interconnects, primarily to compensate for static resonance offset associated with fabrication tolerances, and secondly to overcome any dynamic resonance offset caused by modulation and/or ambient temperature change. Consequently, transmitter optical modulators 114 and wavelength drop filters 122 may be thermally and/or electrically tuned. In the discussion that follows, thermal tuning is used as an illustration.

Figure 2:
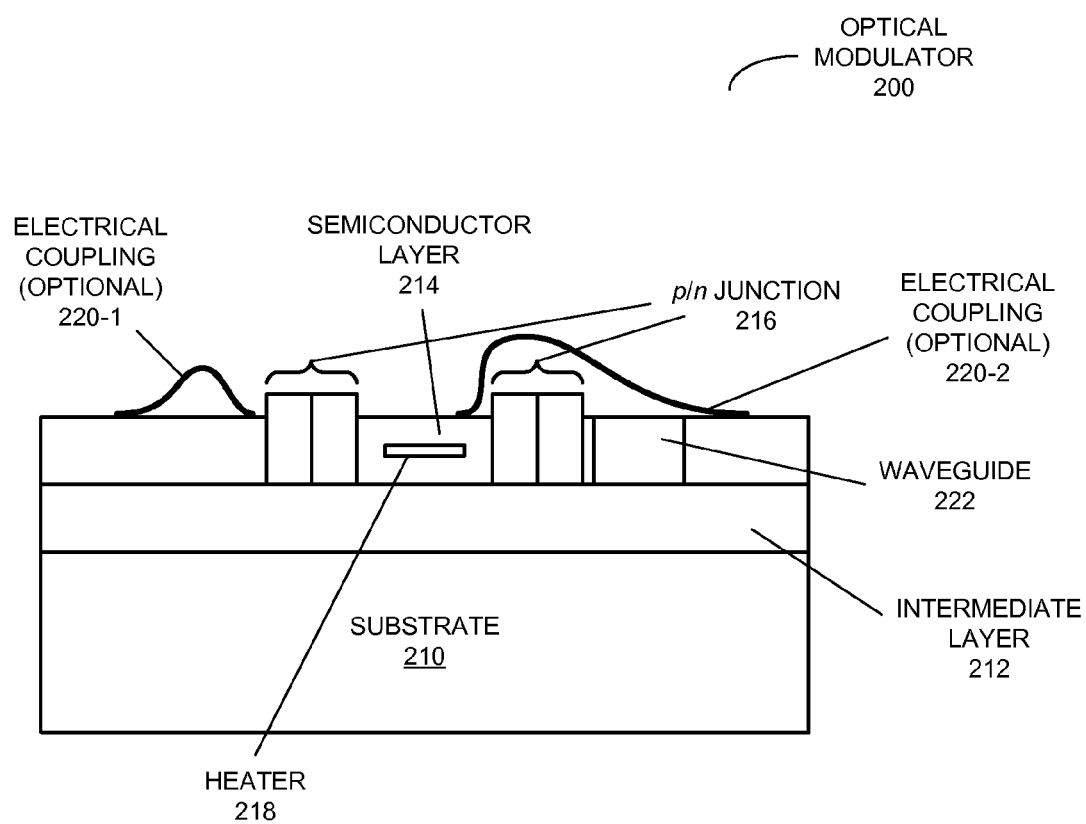
FIG. 2 is a block diagram illustrating an optical modulator in the optical devices in FIGS. 1A and 1B in accordance with an embodiment of the present disclosure.

As described further below with reference to FIG. 2, a given optical modulator (such as transmitter optical modulator 114-1 or wavelength drop filter 122-1) can be thermally tuned using a heater element. In particular, each of the transmitter optical modulators 114 and the wavelength drop filters 122 may have target or design operating wavelength(s) at a given temperature and FSR. The target operating wavelength(s) for the transmitter optical modulators 114 (or the wavelength drop filters 122) may be different than one another (for example, different target operating wavelengths may be associated with different optical path lengths in ring resonators in the optical modulators). These target operating wavelength(s), in conjunction with the FSRs, may encompass the band of wavelengths of the optical signals. However, because of variation during the fabrication process (for example, in the optical-waveguide widths, the silicon thicknesses, the etch depths in rib optical waveguides and/or in the radii of the ring resonators), the actual operating wavelength(s) may be different from the target operating wavelength(s). Consequently, in response to signals from control logic 126, heater elements in the optical modulators may vary the local temperatures in the optical modulators to thermally tune the actual operating wavelengths so that they better match the carrier wavelengths.

In addition, instead of using predefined assignments of transmitter optical modulators 114 (and/or wavelength drop filters 122) to corresponding carrier wavelengths in the optical signals, control logic 126 may assign transmitter optical modulators 114 (and/or wavelength drop filters 122) to corresponding carrier wavelengths based at least on differences between the carrier wavelengths and the actual operating wavelengths, thereby reducing an average tuning range, and thus, an average thermal tuning energy, associated with heating elements in transmitter optical modulators 114 (and/or wavelength drop filters 122). (This technique for spreading the carrier wavelengths or resonances of the optical modulators is sometimes referred to as a 'synthetic resonant comb' technique.) For example, the average tuning range may be significantly less than one half of an average of the FSRs of transmitter optical modulators 114 (and/or wavelength drop filters 122). In some embodiments, control logic 126 assigns transmitter optical modulators 114 (and/or wavelength drop filters 122) to corresponding carrier wavelengths in order to minimize the average thermal tuning energy.

Note that this assignment may be performed: once, continuously or as needed. Thus, control logic 126 may dynamically perform the assignment during operation of optical device 100. Alternatively or additionally, control logic 126 may perform the assignment during a calibration mode.

Figure 1B:
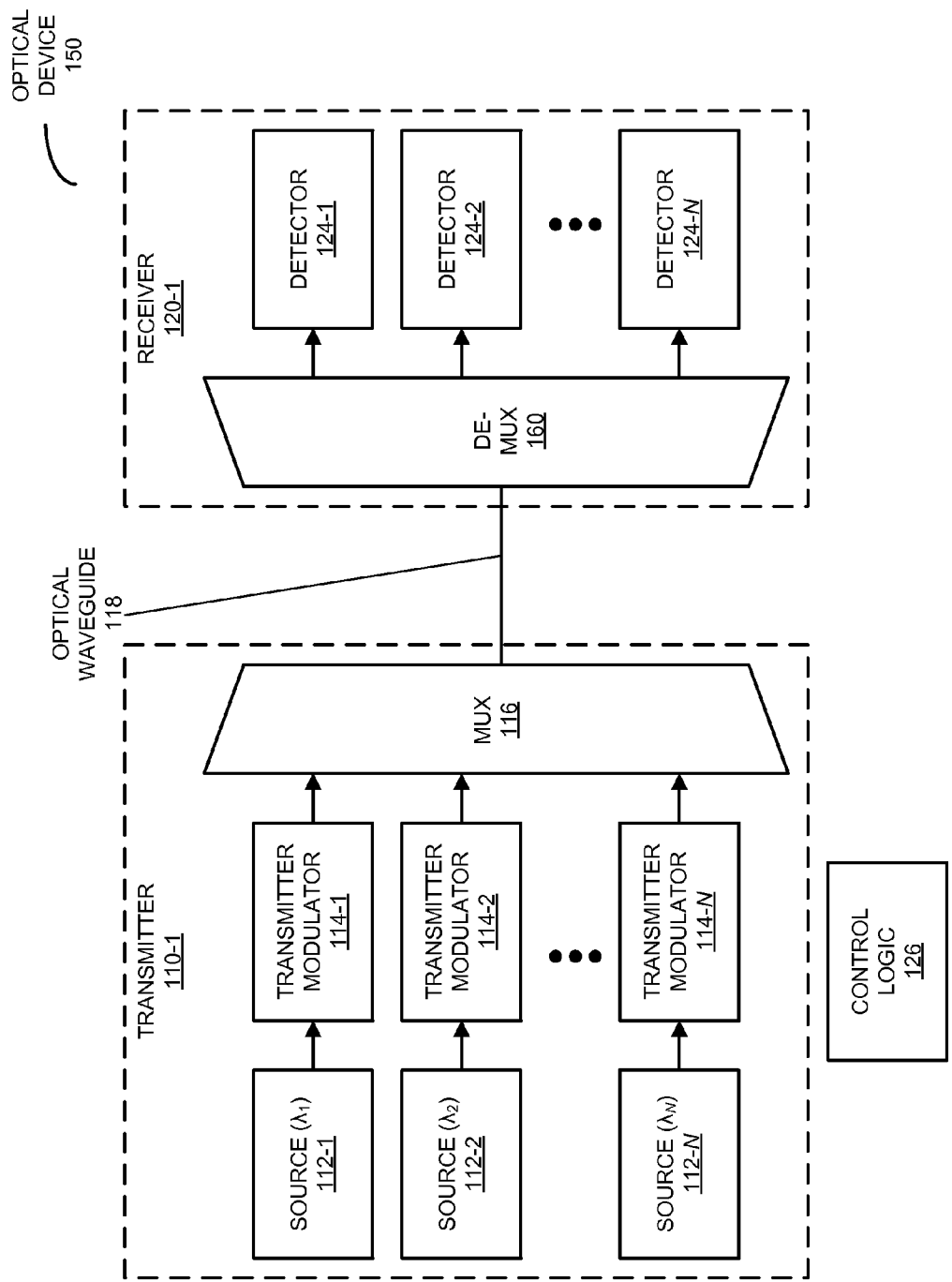
FIG. 1B is a block diagram illustrating an optical device in accordance with an embodiment of the present disclosure.

As shown in FIG. 1B, which presents a block diagram illustrating an optical device 150 that may be implemented on one or more substrates, in other embodiments, rather than simultaneously modulating and multiplexing the spatially cascaded transmitter optical modulators 114 (FIG. 1A), the information is communicated to receiver 120-1 by modulating optical signals provided by sources 112 using transmitter optical modulators 114, and the resulting modulated optical signals are multiplexed onto optical waveguide 118 using optical multiplexer (MUX) 116. At receiver 120-1, the modulated optical signals are separated using optical de-multiplexer 160 (which performs de-multiplexing), and the information is recovered using optical detectors 124. FIG. 1B illustrates how broadband modulators, e.g. electro-absorption-based modulators (such as QCSE devices) are typically used. In particular, the wavelength channels are in separate sources (or waveguides) prior to modulation, and are then multiplexed into a single optical waveguide 118 for transport across optical device 150. Note that in optical device 150 the configuration technique described below may be applied by control logic 126 to tune optical de-multiplexer 160.

Thermal modulation using heating elements in the optical modulators typically can only shift the actual operating wavelengths in one direction. As a consequence, depending on the difference between the actual operating wavelengths and the target operating wavelengths, the actual operating wavelengths of transmitter optical modulators 114 (and/or wavelength drop filters 122) may need to be shifted in the worst case all the way through 360°. In some embodiments, if the bandwidth encompassed by the optical modulators is larger than the bandwidth of the optical signals, it may be possible to reduce the average tuning energy even for this worst-case scenario. For example, there may be more transmitter optical modulators 114 (and/or wavelength drop filters 122) than the number of carrier wavelengths, i.e., M may be greater than N in optical device 150. In these embodiments, control logic 126 can leave at least one of transmitter optical modulators 114 (and/or wavelength drop filters 122) unassigned, and thus, unused, during operation of optical device 150. In particular, control logic 126 may only assign the transmitter optical modulators 114 (and/or wavelength drop filters 122) with actual operating wavelengths that are closest to the target operating wavelengths.

While FIGS. 1A and 1B illustrate WDM links with a transmitter 110-1 and receiver 120-1, in some embodiments there are multiple sets of optical signals and corresponding multiple instances of transmitters 110 and receivers 120.

We now describe the optical modulators in more detail. For a silicon-based optical modulator, thermal tuning is often based on the increase in the index of refraction of silicon with increasing temperature. In particular, by changing the temperature in a ring optical waveguide in the optical modulator, the index of refraction, as well as the optical phase (which is proportional to the index of refraction) of the propagating laser light in the optical waveguide, can be tuned. This is shown in FIG. 2, which presents a block diagram illustrating a cross-sectional view of an optical modulator 200 in optical devices 100 (FIG. 1A) and 150 (FIG. 1B). This optical device includes: a substrate 210, an intermediate layer 212 deposited on the substrate 210, and a semiconductor layer 214 deposited on the intermediate layer 212. This semiconductor layer includes a thermally tunable resonant ring optical waveguide, as illustrated by p/n junction 216. (Note that the ring optical waveguide may be a ring resonator, so the two portions of p/n junction 216 shown in FIG. 2 are actually part of one continuous structure.) For example, substrate 210 may include silicon, intermediate layer 212 may include an oxide (such as silicon dioxide), and/or semiconductor layer 214 may include silicon. Therefore, substrate 210, intermediate layer 212 and semiconductor layer 214 may comprise a silicon-on-insulator (SOI) technology. Furthermore, silicon semiconductor layer 214 may be 0.3-0.5 µm thick and silicon-dioxide intermediate layer 212 may have a thickness between 0.001 and 10 µm.

As noted previously, a resonant wavelength of the ring optical waveguide may be a function of the temperature of p/n junction 216. In some embodiments, a heater 218 is implemented proximate to the ring optical waveguide in order to thermally tune the actual operating wavelength(s) of optical modulator 200. However, in other embodiments, resistive heating is implemented inside the ring optical waveguide (instead of using heater 218). For example, one or more heating elements may be integrated in the ring optical waveguide (for example, using implantation) and a controlled amount of current may be sourced from a tuning circuit to these heating elements.

Note that operating bias from a power source (not shown) for the ring optical waveguide may be provided by highly doped, low-resistance electrical modulator contacts via optional electrical couplings 220. Alternatively or additionally, these optional electrical couplings may provide electrical current (or voltage) to heater 218.

As shown in FIGS. 1A and 1B, a given instance of an optical device may include multiple optical modulators, such as optical modulator 200. Temperatures of the ring optical waveguides in each instance of the optical modulators may be individually programmed, so that one or more ring optical waveguides can have different temperatures than other ring optical waveguides in the optical modulators. Consequently, heating elements, such as heater 218, can be used to produce arbitrary, programmable thermal profiles across an array of optical modulators to create the necessary tuning, modulation and/or other functionality. Once the heaters or heating elements are turned on, the power to each may be selected to increase the temperature of each optical modulator by the appropriate amount to achieve the desired operating temperature, and thus, the desired actual operating wavelengths. The temperature of each of the optical modulators may be regulated using a temperature control mechanism, such as biased temperature control.

In some operating conditions, the absolute wavelength range of the array of optical modulators may experience thermal drift. This can occur if the ambient temperature changes or if there is some global change in the temperature of substrate 210. However, even in this situation, active thermal management of the resonant wavelengths of the ring optical waveguides in the optical modulators will still produce and maintain the correct actual operating wavelengths as long as the chip does not experience thermal runaway. This possibility can be substantially mitigated if active cooling is also used to control and maintain the global temperature of substrate 210 at a predetermined level.

We now describe an exemplary embodiment of the ring resonators in the optical modulators in optical devices 100 (FIG. 1A) and 150 (FIG. 1B) in more detail. The resonant wavelengths of a ring resonator satisfy the following formula.

$$n \cdot 2\pi R = m\lambda, \quad (1)$$

where n is the effective index of refraction of the ring optical waveguide, R is the radius of the ring resonator, and m is an integer. This equation can be re-expressed as $$\frac{\delta\lambda}{\lambda} = \frac{\delta R}{R} + \frac{\delta n}{n} \quad (2)$$

When an optical modulator is designed, an effective index of refraction and a radius are typically assumed in order to obtain target resonant wavelength(s), and thus, target operating wavelength(s) of the optical modulator. However, as noted previously, because of fabrication inaccuracy, there can be an error in the radius (δR). Furthermore, the effective index of refraction can also vary from the design assumption because of effects such as: thickness variations in silicon across an SOI wafer, doping, inaccuracy in the width of the ring optical waveguide, surface roughness during fabrication, and/or ambient temperature changes. As indicated in Eqn. 2, changes in these parameters will cause a shift of the resonance wavelengths (and thus, the actual operating wavelengths) of the ring resonator.

Figure 3:
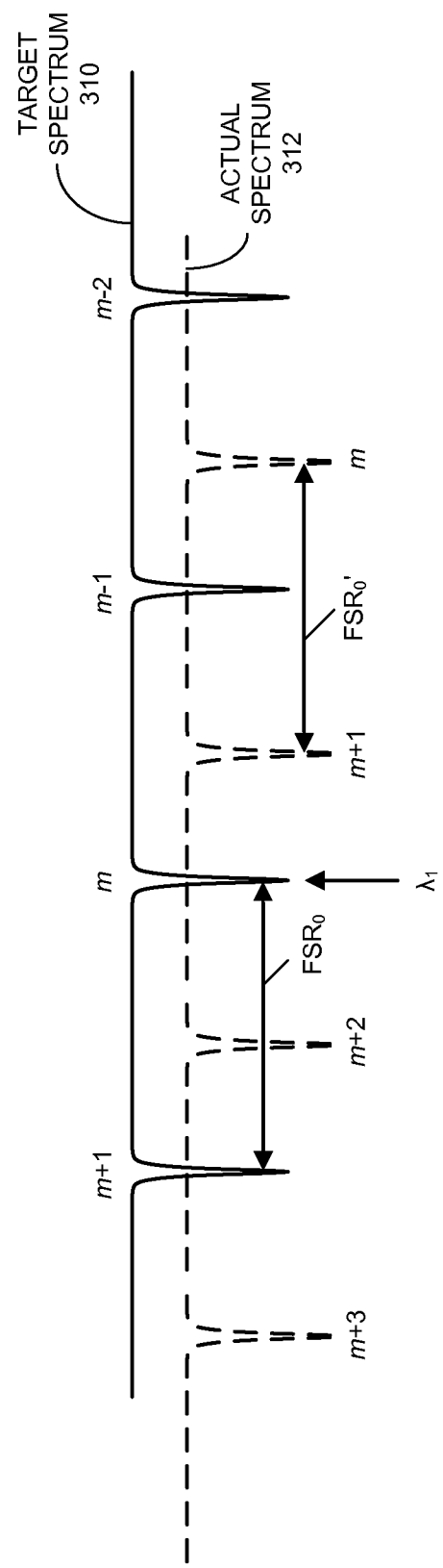
FIG. 3 is a drawing illustrating optical spectra of an optical modulator in the optical devices in FIGS. 1A and 1B in accordance with an embodiment of the present disclosure.

A target optical spectrum 310 and an actual optical spectrum 312 for a single ring resonator (such as in one of the optical modulators in FIGS. 1A and 1B) are shown in FIG. 3. In target optical spectrum 310, the $m^{th}$ order resonance of the ring resonator is at predefined wavelength $\lambda_1$ (such as one of the carrier wavelengths). In addition, the target free spectral range of the ring resonator is $FSR_0$, while the actual free spectral range of the ring resonator is $FSR_0'$. (Note that the FSR of the ring resonator defines the repeating values of resonance in the comb optical spectra.)

Because of the errors discussed above, the $m^{th}$ order resonance in actual optical spectrum 312 is at a different wavelength than predefined wavelength $\lambda_1$, and the predefined wavelength $\lambda_1$ is not aligned with any resonance in the actual optical spectrum 312. Moreover, the fabrication errors can be significant, e.g., the offset in the index of refraction can be as large as 1%. As a consequence, the location of the $m^{th}$ order resonance of the ring resonator can be a few FSRs ranges away from the predefined wavelength $\lambda_1$. Fortunately, given the periodic nature of the optical spectrum of the ring resonator, the optical modulator will work if the nearest neighboring resonance is tuned to align with $\lambda_1$. The maximum amount of tuning, $\pm FSR_0'/2$ (or $\pi$ in phase), is used when $\lambda_1$ occurs in the middle of the two resonances in actual optical spectrum 312. However, as noted previously, the resulting average thermal tuning energy can be prohibitive for a group of optical modulators in an optical device.

In some designs, the radius of the ring resonators is as small as possible, which results in the largest possible FSR. For example, with a radius of 2-3 µm, the FSR may be 20 nm. This design has a low modulation or switching energy. However, the thermal tuning energy increases with the FSR. On the other hand, in order to reduce the tuning range, the FSR may be reduced by increasing the radius of the ring resonator. However, the thermal tuning energy may be similar (or unchanged) because of the increase in the size of the ring resonator.

Said differently, when there is only one ring modulator on a waveguide (i.e., when only a single wavelength goes through optical device 100 in FIG. 1A), a maximum tuning of up to one FSR may be needed to bring the nearest resonance of the ring resonator to its predefined-wavelength channel regardless of how big the offset is because of imperfect fabrication. In order to further reduce the tuning range, the FSR may be reduced. However, reducing the FSR typically requires increasing the ring size, which increases the tuning energy per unit nanometer of shift. These two effects often cancel each other out. In other words, the tuning energy remains similar because the device is larger even though the tuning range is smaller.

However, with multiple ring modulators cascaded on one waveguide, the tuning range and tuning energy can be significantly reduced systematically. In general, ring-resonator devices with the same parameters fabricated in close proximity show good, repeatable uniformity with relative resonance offsets of about 1 nm (root-mean-square). Consequently, the tuning range can be reduced without significantly increasing the ring size using the cascaded rings. In particular, multiple ring resonators or optical modulators can be used and may be assigned to carrier wavelengths by control logic 126 (FIGS. 1A and 1B) based at least on their actual operating wavelengths. In this way, the ring resonators provide an effective optical spectrum associated with a large ring resonator, which reduces the average tuning distance and the average thermal tuning energy.

Figure 4:
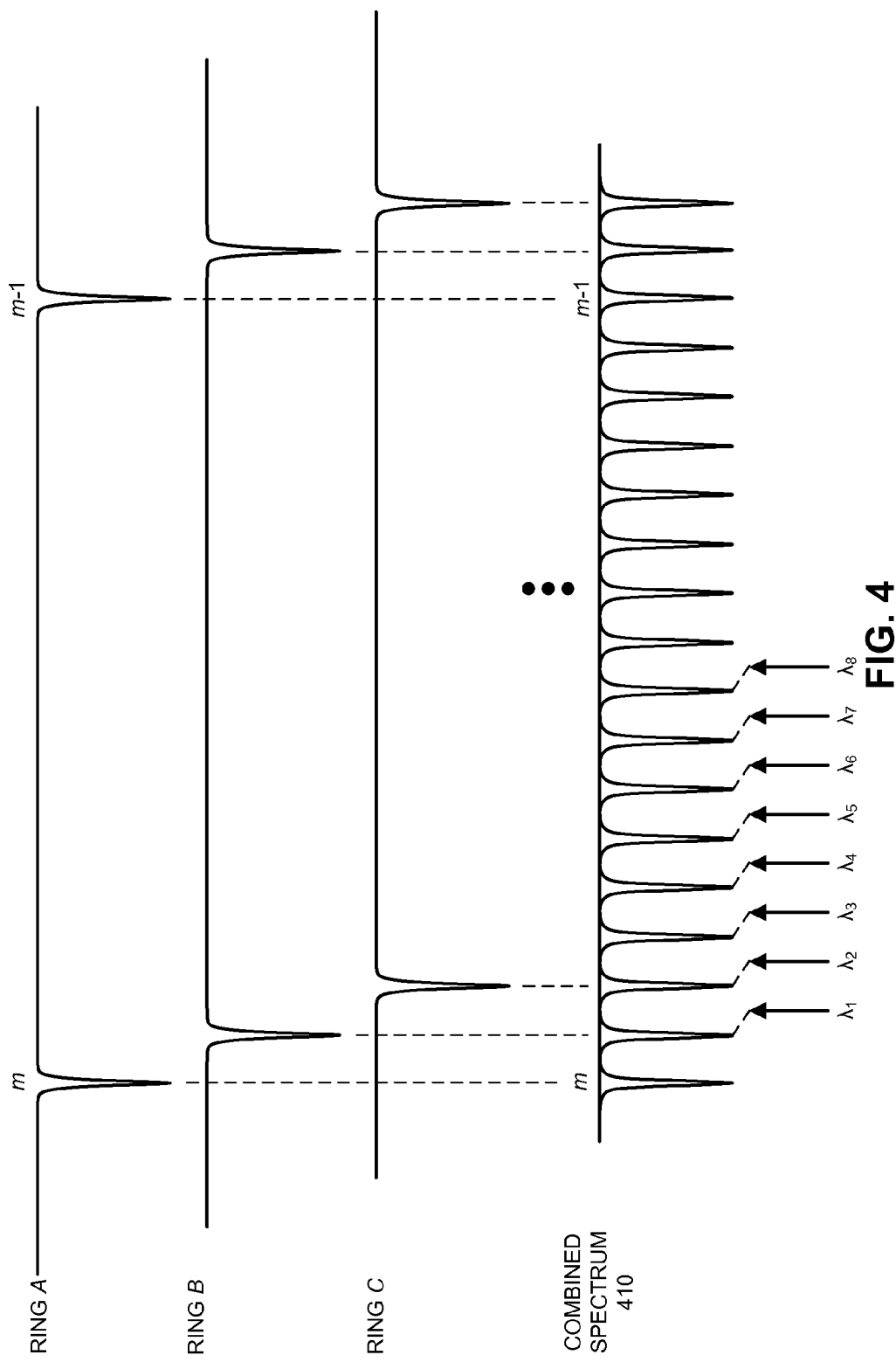
FIG. 4 is a drawing illustrating optical spectra of the optical modulators in the optical devices in FIGS. 1A and 1B in accordance with an embodiment of the present disclosure.

This is shown in FIG. 4, which presents a drawing illustrating optical spectra of transmitter optical modulators 114 (or wavelength drop filters 122) in optical device 100 (FIG. 1A). In this example, there are 8 carrier wavelengths (for 8 corresponding channels) spaced by a channel spacing of $\delta\lambda$. Each ring resonator is designed to have an FSR of around $n\delta\lambda$, and the $m^{th}$ order of their resonances is designed to align with the predefined wavelengths $\lambda_1, \lambda_2, \ldots \lambda_8$. As shown in combined spectrum 410 of the cascaded ring resonators, the resonances of the ring resonators will fill the entire spectral space.

Because of the fabrication variation, the actual $m^{th}$ order of the resonances may be more than 10 nm offset from the targeted operating wavelengths. However, because this offset is typically similar for ring resonators in close proximity (i.e., the resonances of ring resonators in close proximity tend to wander together as a group), combined spectrum 410 of the ring resonators typically remains largely unchanged except for some random channel spacing variation (which is approximately ±1 nm). As shown in FIG. 4, instead of tuning the $m^{th}$ order of ring resonator A to its target operating wavelength $\lambda_1$, control logic 126 (FIGS. 1A and 1B) can assign and tune a resonance of another ring resonator that is the closest to $\lambda_1$, for example, the $m^{th}$ order resonance of ring resonator B. Applying the same approach to the remainder of the carrier wavelengths, the tuning range of the WDM link can be reduced to approximately the channel spacing instead of the whole FSR. In some embodiments, the registration process only needs to be performed once, when the optical device is first turned on. One potential issue is that different resonances may have different extinction ratios due to wavelength-sensitive coefficients. However, experimental results indicate that this difference is small across a wide range of wavelengths.

This configuration technique can effectively and systematically reduce or minimize the total static tuning energy for all of the ring resonators. While dynamic tuning may still be used to address ambient temperature change, this can also be reduced or minimized using appropriate cooling techniques, as is known to one of skill in the art.

As an illustration of the configuration technique, consider a WDM link with 3 carrier wavelengths, 2 nm spacing between the channels, and 10 nm of fabrication variation or uncertainty (for a given fabrication technology). The FSR of the ring resonators may be 6 nm, and the carrier wavelengths may be spread equally across the FSR. Thus, the distance between any two carrier wavelengths is one-third of the FSR. The ring resonators may be designed with slightly different sizes such that the targeted working resonance orders are 2 nm apart. Effectively, the combined spectrum of the three ring resonators may form a comb spectrum with 2 nm spacing for a fairly broad wavelength range around the target working resonance order. The actual operating wavelengths will vary because of the fabrication variation of 10 nm. However, this variation may equally affect the rings in a close proximity. In other words, the three ring resonators discussed here may all have a 10 nm operating wavelength shift. Although the designed ring resonance order is 10-nm away, the control logic 126 (FIGS. 1A and 1B) may only need to tune a different order resonance of the ring resonators in an optical modulator to their nearest carrier wavelength, instead of tuning the designed resonance order to its targeted carrier wavelength that is 10 nm away. Because the combined comb spacing is roughly the same as the carrier-wavelength spacing, only 2 nm of maximum tuning per channel may be needed.

Note that this configuration technique works so long as the carrier wavelengths are collocated on an optical waveguide, which allows control logic 126 in FIGS. 1A and 1B to assign the ring resonators to the carrier wavelength(s). In addition, because control logic 126 in FIGS. 1A and 1B can assign the optical modulators on an individual basis, a fixed number of offsets between the carrier wavelengths and the actual operating wavelengths of the ring resonators or errors that span the entire bandwidth can be addressed.

One difficulty in implementing this configuration technique is having the same $m^{th}$ order of the ring resonators designed to align with the carrier wavelengths. For example, consider a WDM link with 8 carrier wavelengths and a channel spacing of 1.6 nm. Suppose that the $120^{th}$ resonance of a ring resonator, which has an FSR of 12.8 nm, a radius of 8.707 μm and an effective index of refraction of 3.4, is targeted at a carrier wavelength of 1550 nm. In order to have a second ring resonator (in another optical modulator) targeted to 1551.6 nm with the same order of resonance, the radius of this ring resonator needs to be 8.716 μm. It may be difficult to fabricate ring resonators with such a small radius difference even with e-beam lithography. One solution to this problem is to have the second ring resonator targeted at the carrier wavelength of the neighboring channel, at say 1551.6 nm, using its $(m+1)^{th}$ order resonance. For an FSR of 12.7 nm, this results in a radius of 8.788 μm. Applying the same design principle to the remainder of the ring-resonator optical modulators, the resonances of the ring resonators will fill the optical spectrum as desired. Note that, while identical FSRs may be used for the different ring resonators, small differences in the FSRs over the bandwidth can be tolerated. Furthermore, the impact of small differences in the FSRs on the tuning energy can be reduced by using a finer line-width fabrication technology. For example, assuming that less than a 10-15 nm size difference can be achieved between the ring resonators, the channel spacing change due to comb center or FSR shifts can be reduced significantly. Indeed, a similar design with ring-resonator size ranging from 9.328 um to 9.395 um with approximately a 9.6 nm increment may have almost unchanged resonances or operating wavelengths even for ±15 nm comb center shifts due to fabrication tolerances and, therefore, may not increase the tuning power further.

Figure 5:
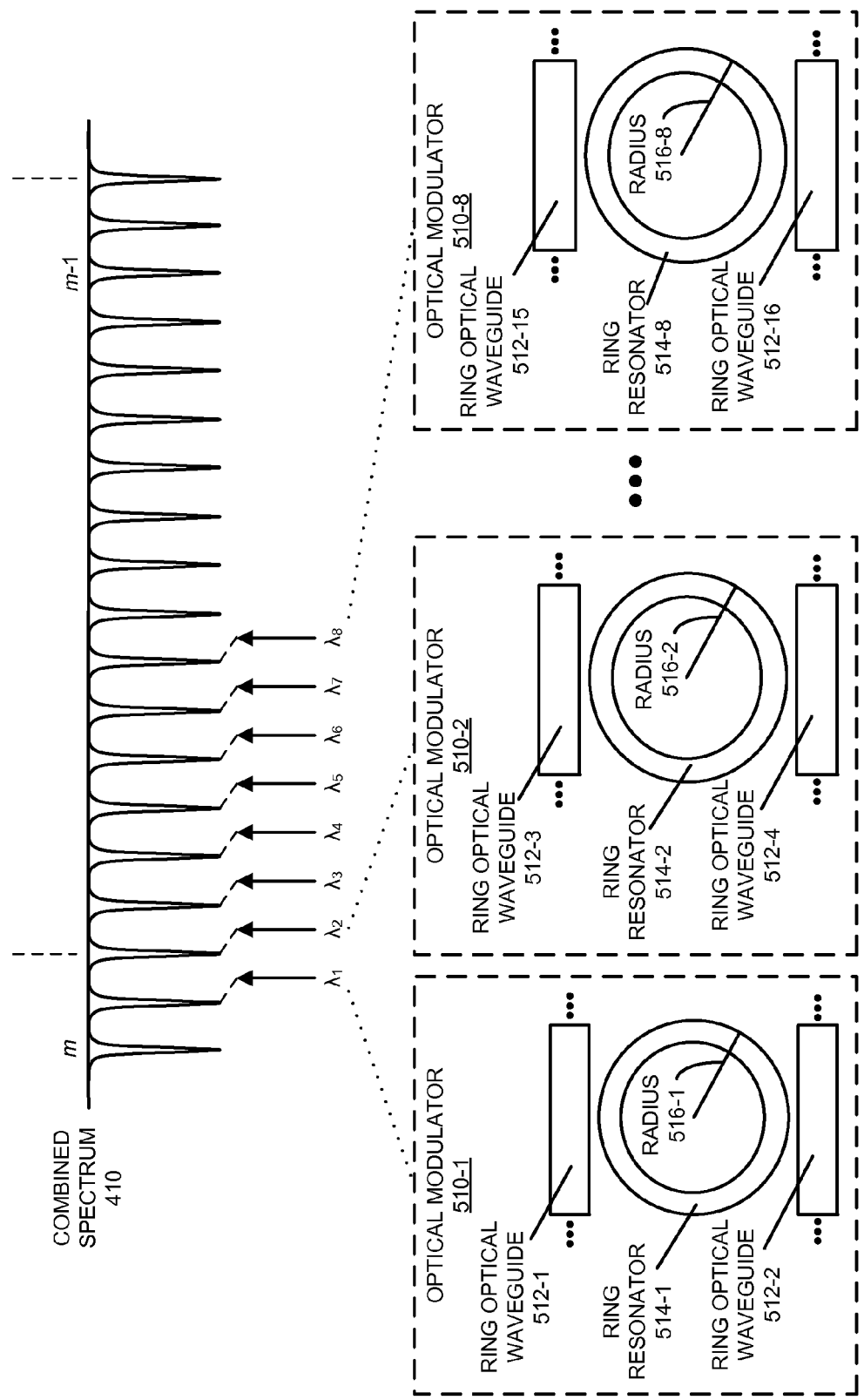
FIG. 5 is a block diagram illustrating optical modulators with cascaded, incrementally larger ring resonators in accordance with an embodiment of the present disclosure.

Thus, in some embodiments, the tuning energy is reduced (and the manufacturing yield can be increased) by spreading the target operating wavelengths of the ring resonators (i.e., the resonances) across their average FSR and/or over the band of wavelengths or the spectrum associated with the optical signal(s). For example, the target operating wavelengths can be varied by incrementally varying the radius (circumference) of the ring resonators. This is illustrated in FIG. 5, which presents a block diagram illustrating optical modulators 510 with ring optical waveguides 512 and cascaded, incrementally larger ring resonators 514 having radii 516. As described previously, these ring resonators may be assigned to particular wavelengths $\lambda_i$.

More generally, the target operating wavelengths of the ring resonators may be incrementally varied by varying the optical path length between consecutive ring resonators. This may be implemented using a variety of approaches, including: incrementally varying the width of the optical waveguide in the ring resonators; placing an incremental length of cladding having a different index of refraction along the ring optical waveguide (thereby modifying the effective index of refraction); if the ring uses a rib optical waveguide, incrementally varying the etch depth of the rib optical waveguide in the ring resonators (or increasing the height of the optical waveguide by incremental amounts); implanting an inactive dopant so as to change the index of refraction of the semiconductor layer (such as silicon) in a given ring resonator (for example, with grey scale lithography a linear bias may be used to provide a different dose of impurities to the given ring resonator resulting in an incrementally different index of refraction); locally etching the semiconductor-layer thickness prior to ring-resonator fabrication such that a linear bias of the semiconductor-layer thickness is accomplished in a patterned area so that when the ring resonators are subsequently fabricated, they may be a well-defined linear variation in the semiconductor-layer thickness across the array; applying a different local stress to the given ring resonator so as to change its index of refraction (for example, using stress-engineered materials to accomplish a linear bias of index of refraction or by local bending the substrate); and/or impaling different impurity doses in the buried oxide layer under the given ring resonator so as to linearly change the index of refraction across the array of ring resonators in the optical modulators.

Alternatively or additionally, on the inner or outer circumference of the ring-resonator radius, a patterned, photonic crystal-based corrugated grating or a set of holes may be etched. The former may be equivalent to modulating the width of the optical waveguide with a repetitive pattern. The latter may have the effect of perturbing the index of refraction experienced by the evanescent wave of the optical field outside of the optical waveguide. This may have an equivalent effect to other perturbations of the index of refraction of the optical waveguide. Using this approach, a cascaded array of operating wavelengths may be achieved by linearly varying the number of holes or the frequency of the corrugated grating for the given ring resonator. Note that the holes may be pitched and spaced from the center of the ring resonators so as to trade off the variation in the index of refraction with the optical-loss penalty. Moreover, the photonic crystal hole pattern may be defined on the backside of the buried oxide layer (i.e., underneath the ring resonators). For example, the buried oxide below the ring resonators can be accessed using a backside etch pit in the substrate. In this way, the buried oxide layer associated with the cascaded ring resonators may have a locally different index of refraction below the ring resonators in the optical modulators.

In an exemplary embodiment, incremental cascaded ring resonators were implemented using a nominal ring-resonator radius of 7.5 or 10 μm. The cascaded ring resonators had incrementally increasing radii (on the order of 10-15 nm), which corresponded to a 1.6 nm channel spacing at a wavelength of 1550 nm. When the ring resonators were spaced 45 μm apart on a wafer, the locations of the operating wavelengths (i.e., the resonances) across a given wafer and between wafers were distributed over a 3× wider range than the channel spacing. The 10 μm radius ring resonators had very tight FSR distributions, while the 7.5 μm radius ring resonators had larger FSRs and wider FSR distributions. Note that the resonance variance may increase as the radius of the given ring resonator is reduced because the optical mode for smaller ring resonators tends to be skewed more toward the outer edge of the ring resonators. As a consequence, more of the optical mode interacts with the edge of the ring resonators, where random edge variations and etch non-uniformities can result in a broader distribution of resonance peaks.

While there was a broad variation in the resonances across the FSR on the given wafer, there was no systematic pattern of resonance shift that could be compensated with broad binning and/or by association with the position of the reticle on this wafer. Moreover, with incrementally larger ring-resonator radii (with nominal values of 7.5 or 10 µm), the channel spacing between four closely spaced channels was relatively consistent and could be controlled to a 3σ variation of less than ±0.24 nm (approximately ±30 GHz) for the 10 µm radius ring resonators, and to a 3σ variation of less than ±0.48 nm (approximately ±60 GHz) for the smaller 7.5 µm radius ring resonators.

Furthermore, the average and maximum tuning ranges for the cascaded incremental ring resonators were calculated using Monte-Carlo simulations assuming a random placement of the center of the resonance comb relative to the incoming laser or data wavelengths (for modulation or de-multiplexing, respectively), and assuming a variation in the ring-resonator channel spacing. Moreover, the calculations included the variance of the ring-resonator channel spacing and were bounded by the channel spacing. Note that thermal tuning typically shifts the operating wavelengths by heating the ring resonators (usually, there is no local cooling capability). Thus, any thermal corrections to the operating wavelengths in the calculations were uni-directional. Moreover, in the typical case, a given optical modulator was tuned less than one channel spacing. However, in the worst case, where one resonance is maximally blue shifted while all others are maximally red shifted, the average thermal tuning was larger than the FSR.

In the simulations, there were eight WDM channels with a 1.6 nm (200 GHz) spacing, with each ring resonator having an FSR about 8× the channel spacing (i.e., 12.8 nm or 1.6 THz). The combined spectrum of the eight channels effectively formed a comb filter filling the entire spectrum. Moreover, the resonance wavelength of each ring resonator varied ±0.5 nm (±3σ of 62.5 GHz) relative to its designed center at the maximum (i.e., the target operating wavelength) with a normal (Gaussian) distribution. Furthermore, in the simulations the resonances were spread across the spectrum to approximately satisfy FSR equal to $n\delta\lambda$ by incrementally increasing the optical path length between consecutive ring resonators using one or more of the techniques described previously. (Note that one consequence of spreading the resonances is that this also incrementally changed the FSR of consecutive rings. However, this effect was not significant and in practice was not noticeable in the wavelength band of operation.)

The eight laser wavelengths were pre-selected with 1.6 nm spacing. Although the center of the comb could have more than 10 nm uncertainty, using its periodic nature and assuming the filter channels could be re-assigning to particular laser wavelengths when the system started up, the effective group-center variation was reduced one channel spacing, i.e. to ±0.8 nm with a uniform distribution.

The calculated average tuning range was 1.03 nm. Moreover, 95% of the simulations resulted in an average tuning range of approximately 1.7 nm for a given ring resonator having an FSR of 12.8 nm, a wavelength spacing of 1.6 nm, and a 6σ local variation of ±0.48 nm (which is more than 2× the observed local variation for 10 µm ring resonators). In contrast, when similar Monte-Carlo simulations were performed for ring resonators placed farther apart (e.g., a 500 µm pitch), the average tuning range was 1.18 nm, and 98% of the simulations resulted in an average tuning range of approximately 2 nm.

In embodiments where the variation of resonances or the operating wavelengths is less than the channel spacing, a system design may use a smaller channel spacing. For example, using a 6σ variation of ±0.48 nm, 16 channels with the same FSR of 12.8 nm and a 0.8 nm spacing between channels, the average tuning range was 0.68 nm, and 95% confidence was achievable with an average tuning range of 1 nm. As mentioned previously, even further reductions in these values may be possible if the 6σ variation of ±0.24 nm for the 10 µm radius ring resonators was used.

Furthermore, the average tuning power for a WDM link that includes cascaded, incremental ring resonators can be determined from the tuning requirements. For a back-etched rib optical waveguide, a tuning efficiency as large as 3.9 mW per FSR has been demonstrated. Similarly, for an undercut-etched wire optical waveguide, a tuning efficiency as large as 2.4 mW per FSR has been demonstrated. Assuming an average tuning of approximately 1.7 nm for tightly spaced optical modulators with a 1.6 nm channel (at a 95% confidence level), the tuning power for the wire optical-waveguide device is 0.3 mW and the tuning for the rib optical-waveguide device is 0.52 mW. This is equivalent to a static tuning energy of 15 fJ/bit at a bit rate of 20 Gbps for the wire optical-waveguide device. Because a WDM link would require two such devices (the modulator and the demodulator), the static-link tuning energy budget is estimated at 30 fJ/bit, which is consistent with an ultra-low power budget link. Furthermore, by using a narrower wavelength grid with 16 channels spaced at 0.8 nm (100 GHz), the static-link tuning energy can be reduced to approximately 19 fJ/bit for the wire optical-waveguide device and 30 fJ/bit for the rib optical-waveguide device (assuming an average tuning range at 95% confidence of 1 nm).

Thus, in some embodiments, local uniformities in the relative position and spacing of the resonance or operating wavelengths (on the length scale of millimeters and less) can be exploited through the use of cascaded ring resonators with incremental variations in their target operating wavelengths. In particular, using a design rule that the FSR is approximately equal to $n\delta\lambda$ in conjunction with a wavelength-assignment technique to take advantage of these local uniformities, the static-link tuning energy requirements can be reduced or minimized for a WDM link that includes a wavelength-division multiplexed transmitter and a corresponding de-multiplexing receiver. These embodiments may enable inter- and intra-chip silicon photonic links, especially in energy-sensitive applications.

As noted previously, it is statistically possible that a worst-case offset may occur between the actual operating wavelengths and the carrier wavelengths. To prevent this from occurring over multiple instances of transmitters 110 (FIGS. 1A and 1B) and receivers 120 (FIGS. 1A and 1B) on a wafer, in some embodiments differences between spacings of the target operating wavelengths of the transmitter optical modulators 114 (FIGS. 1A and 1B) and/or the wavelength drop filters 122 (FIG. 1A) and a spacing of the carrier wavelengths may be designed to provide a Vernier effect. For example, the spacing of the carrier wavelengths may be 9 nm, while adjacent target operating wavelengths of optical modulators may be spaced by 8.8 nm, 9 nm and 9.2 nm. This may ensure that, statistically, over the area of a substrate (such as in an integrated circuit), there is a small variation between the actual operating wavelengths and the carrier wavelengths, which may make it easier to thermally tune the optical modulators, and may reduce the average thermal tuning energy.

Figure 6:
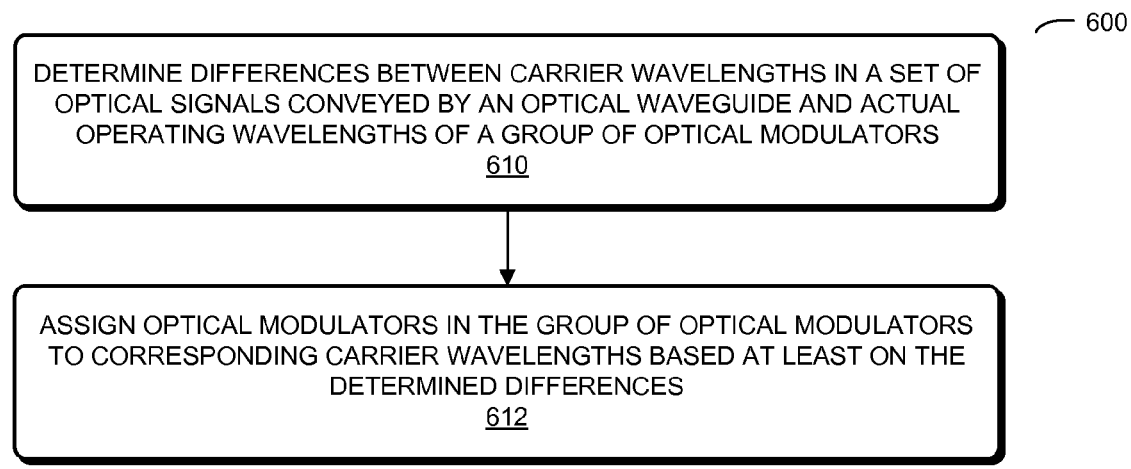
FIG. 6 is a flow chart illustrating a process for configuring the optical devices in FIGS. 1A and 1B in accordance with an embodiment of the present disclosure.

We now describe embodiments of a process for configuring an optical device, such as optical devices 100 (FIG. 1A) and 150 (FIG. 1B). FIG. 6 presents a flow chart illustrating a process 600 for configuring an optical device, which may be performed by control logic 126 (FIGS. 1A and 1B). During this process, the control logic determines the differences between the carrier wavelengths in the set of optical signals and the actual operating wavelengths of the group of optical modulators (operation 610). Note that the optical modulators may have target operating wavelengths that are distributed over a band of wavelengths associated with the set of optical signals. Then, the control logic assigns optical modulators in the group of optical modulators to corresponding carrier wavelengths based at least on the determined differences, thereby reducing the average tuning energy associated with the heating elements (operation 612).

In some embodiments of process 600, there may be additional or fewer operations. Moreover, the order of the operations may be changed and/or two or more operations may be combined into a single operation.

Figure 7:
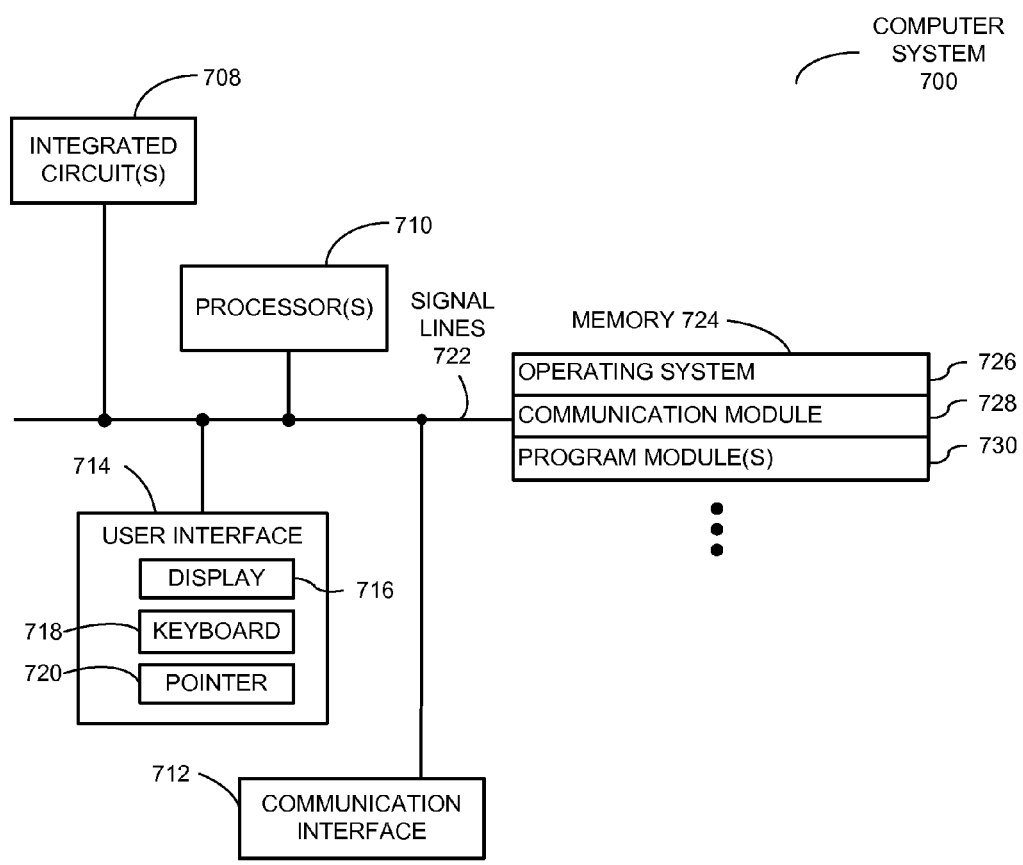
FIG. 7 is a block diagram illustrating a computer system that includes an integrated circuit with one or more of the optical devices in FIGS. 1A and 1B in accordance with an embodiment of the present disclosure.

We now describe embodiments of a computer system. FIG. 7 presents a block diagram illustrating a computer system 700 that includes an integrated circuit with one or more of the optical devices, such as optical device 100 (FIG. 1A) and/or 150 (FIG. 1B). Computer system 700 includes: one or more processors (or processor cores) 710, a communication interface 712, a user interface 714, and one or more signal lines 722 coupling these components together. Note that the one or more processors (or processor cores) 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer 720, such as a mouse.

Memory 724 in computer system 700 may include volatile memory and/or non-volatile memory. More specifically, memory 724 may include: ROM, RAM, EPROM, EEPROM, flash, one or more smart cards, one or more magnetic disc storage devices, and/or one or more optical storage devices. Memory 724 may store an operating system 726 that includes procedures (or a set of instructions) for handling various basic system services for performing hardware-dependent tasks. Moreover, memory 724 may also store communications procedures (or a set of instructions) in a communication module 728. These communication procedures may be used for communicating with one or more computers, devices and/or servers, including computers, devices and/or servers that are remotely located with respect to the computer system 700.

Memory 724 may also include one or more program modules 730 (or sets of instructions). Note that one or more of program modules 730 may constitute a computer-program mechanism. Instructions in the various modules in the memory 724 may be implemented in: a high-level procedural language, an object-oriented programming language, and/or in an assembly or machine language. The programming language may be compiled or interpreted, i.e., configurable or configured, to be executed by the one or more processors (or processor cores) 710.

Computer system 700 may also include one or more integrated circuits 708 that include one or more instances of optical devices 100 (FIG. 1A) and/or 150 (FIG. 1B). For example, the optical devices may be included in a multi-chip module (MCM) (such as a switch or a processor). This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Computer system 700 may include, but is not limited to: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. For example, integrated circuit(s) 708 may be included in a backplane that is coupled to multiple processor blades, or integrated circuit(s) 708 may couple different types of components (such as processors, memory, I/O devices, and/or peripheral devices). Thus, integrated circuit(s) 708 may perform the functions of: a switch, a hub, a bridge, and/or a router. Note that computer system 700 may be at one location or may be distributed over multiple, geographically dispersed locations.

Optical device 100 (FIG. 1A), optical device 150 (FIG. 1B), optical modulator 200 (FIG. 2) and/or computer system 700 may include fewer components or additional components. For example, in inter-chip communication embodiments, transmitter 110-1 (FIGS. 1A and 1B) and receiver 120-1 (FIGS. 1A and 1B) may be implemented on separate substrates, and wavelength drop filters 122 (FIG. 1A) may be assigned to carrier wavelengths by a separate instance of control logic 126 (FIGS. 1A and 1B) on the second substrate. In some embodiments, one or more optical modulators in optical devices 100 (FIG. 1A) and 150 (FIG. 1B) include a double ring resonator.

Moreover, although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of the computer system 700 may be implemented in one or more application-specific integrated circuits (ASICs) and/or one or more digital signal processors (DSPs). Furthermore, functionality in optical device 100 (FIG. 1A), optical device 150 (FIG. 1B), optical modulator 200 (FIG. 2) and/or computer system 700 may be implemented more in hardware and less in software, or less in hardware and more in software, as is known in the art.

While the preceding discussion has used optical modulators as an illustration, in other embodiments the configuration technique may be used in conjunction with a wide variety of optical components in an optical device, such as: an optical filter, an optical multiplexer, an optical de-multiplexer and an optical add/drop. As known to one of skill in the art, a wide variety of fabrication techniques may be used to fabricate optical device 100 (FIG. 1A), optical device 150 (FIG. 1B), and/or optical modulator 200 (FIG. 2).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device deposited on a substrate, comprising:
   an optical waveguide configured to receive a set of optical signals, wherein a given optical signal has a carrier wavelength, and wherein carrier wavelengths of the set of optical signals span a band of wavelengths;
   a transmitter which includes:
      a transmitter group of tuning elements; and
      a group of transmitter optical modulators, optically coupled to the optical waveguide and coupled to the corresponding transmitter group of tuning elements configured to tune the group of transmitter optical modulators, wherein the group of transmitter optical modulators have target operating wavelengths, actual operating wavelengths, and free spectral ranges, and wherein transmitter optical modulators in the group of transmitter optical modulators have different target operating wavelengths that are distributed over the band of wavelengths, and
         wherein the free spectral ranges around the target operating wavelengths encompass the band of wavelengths; and
   control logic configured to assign transmitter optical modulators in the group of transmitter optical modulators to corresponding carrier wavelengths based at least in part on differences between the carrier wavelengths and the actual operating wavelengths, thereby reducing an average tuning energy associated with the transmitter group of tuning elements.

2. The optical device of claim 1, wherein the target operating wavelengths of adjacent transmitter optical modulators are separated by a wavelength increment.

3. The optical device of claim 1, wherein the transmitter optical modulators include ring resonators having different resonant wavelengths, which correspond to the target operating wavelengths of the ring resonators.

4. The optical device of claim 3, wherein the different resonant wavelengths are associated with different optical-path lengths in the ring resonators.

5. The optical device of claim 4, wherein the ring resonators have different radii.

6. The optical device of claim 5, wherein the radii are incrementally increased between adjacent ring resonators in the transmitter optical modulators.

7. The optical device of claim 4, wherein the ring resonators have different effective indices of refraction.

8. The optical device of claim 4, wherein the ring resonators have different stresses.

9. The optical device of claim 4, wherein the ring resonators have different widths.

10. The optical device of claim 4, wherein the ring resonators include rib optical waveguides; and
    wherein etch depths of the rib optical waveguides in the ring resonators are different.

11. The optical device of claim 4, wherein the ring resonators are defined on a semiconductor substrate; and
    wherein the semiconductor substrate has a reduced thickness proximate to the ring resonators, thereby providing a linear bias of semiconductor thickness.

12. The optical device of claim 1, wherein the control logic is configured to assign the transmitter optical modulators to the corresponding carrier wavelengths to minimize the average tuning energy.

13. The optical device of claim 1, further comprising:
    a receiver which includes:
       a receiver group of tuning elements;
       a group of receiver optical modulators, optically coupled to the optical waveguide and coupled to the corresponding receiver group of tuning elements configured to tune the group of receiver optical modulators, wherein the group of receiver optical modulators have target operating wavelengths, actual operating wavelengths, and free spectral ranges, wherein receiver optical modulators in the group of receiver optical modulators have different target operating wavelengths that are distributed over the band of wavelengths, and wherein the free spectral ranges around the target operating wavelengths of the group of receiver optical modulators encompass the band of wavelengths; and
       detectors optically coupled to the corresponding receiver optical modulators in the group of receiver optical modulators, wherein the control logic is further configured to assign receiver optical modulators in the group of receiver optical modulators to corresponding carrier wavelengths based at least in part on differences between the carrier wavelengths and the actual operating wavelengths of the receiver optical modulators in the group of receiver optical modulators, thereby reducing an average tuning energy associated with the receiver group of tuning elements.

14. A computer system, comprising an integrated circuit that includes an optical device, the optical device including:
    an optical waveguide configured to receive a set of optical signals, wherein a given optical signal has a carrier wavelength, and wherein carrier wavelengths of the set of optical signals span a band of wavelengths;
    a transmitter which includes:
       a transmitter group of tuning elements; and
       a group of transmitter optical modulators, optically coupled to the optical waveguide and coupled to the corresponding transmitter group of tuning elements configured to tune the group of transmitter optical modulators, wherein the group of transmitter optical modulators have target operating wavelengths, actual operating wavelengths, and free spectral ranges, and wherein transmitter optical modulators in the group of transmitter optical modulators have different target operating wavelengths that are distributed over the band of wavelengths, and
          wherein the free spectral ranges around the target operating wavelengths encompass the band of wavelengths; and
    control logic configured to assign transmitter optical modulators in the group of transmitter optical modulators to corresponding carrier wavelengths based at least in part on differences between the carrier wavelengths and the actual operating wavelengths, thereby reducing an average tuning energy associated with the transmitter group of tuning elements.

15. The computer system of claim 14, wherein the transmitter optical modulators include ring resonators having different resonant wavelengths, which correspond to the target operating wavelengths of the ring resonators.

16. The computer system of claim 15, wherein the different resonant wavelengths are associated with different optical-path lengths in the ring resonators.

17. The computer system of claim 16, wherein the ring resonators have different geometries.

18. The computer system of claim 15, wherein the ring resonators have different effective indices of refraction.

19. The computer system of claim 15, wherein the ring resonators have different stresses.

20. A method for configuring an optical device, wherein the method is performed by control logic in an optical device, the method comprising:

determining differences between carrier wavelengths in a set of optical signals that are conveyed by an optical waveguide and actual operating wavelengths of a group of optical modulators, which are optically coupled to the optical waveguide and coupled to a corresponding group of tuning elements that tune the group of optical modulators, wherein the optical modulators have target operating wavelengths that are distributed over a band of wavelengths associated with the set of optical signals; and assigning optical modulators in the group of optical modulators to corresponding carrier wavelengths based at least in part on the determined differences, thereby reducing an average tuning energy associated with the group of tuning elements.

\* \* \* \* \*